May 19, 1959  N. C. NELSEN  2,887,252
MEASURING LIQUID DISPENSER
Filed Feb. 18, 1957  2 Sheets-Sheet 1
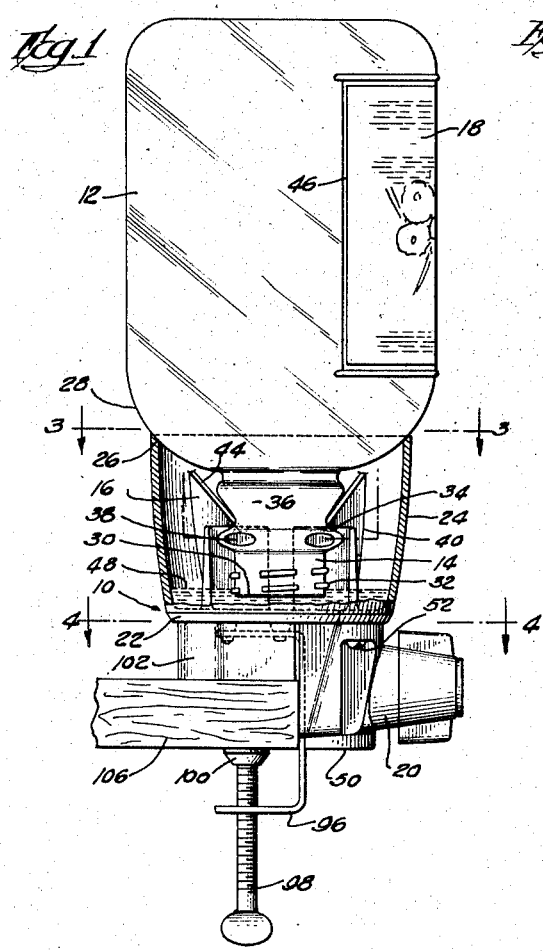
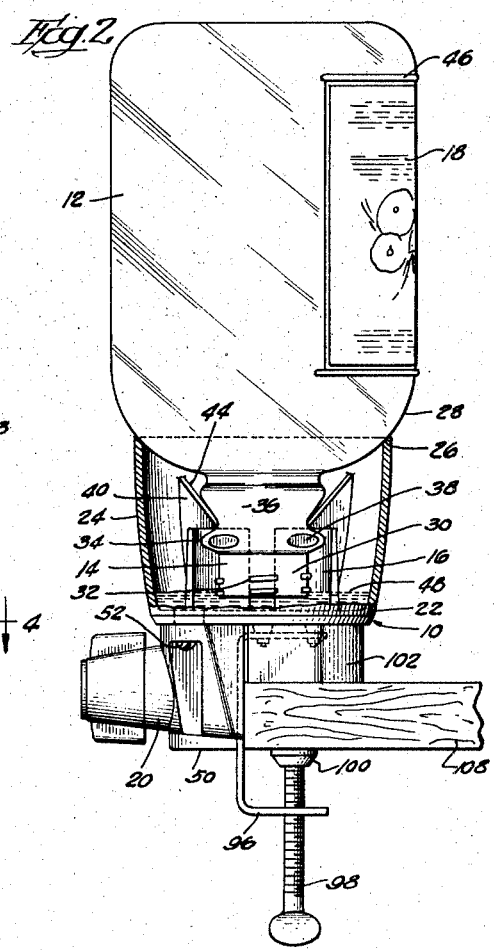
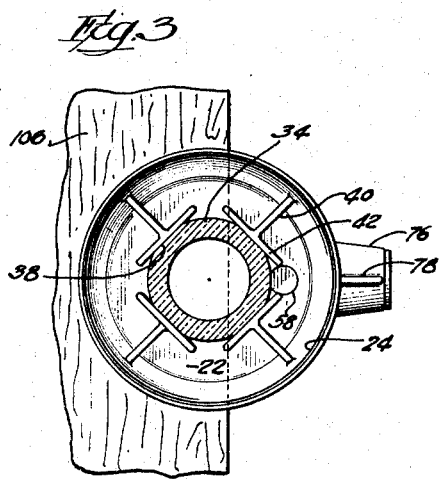
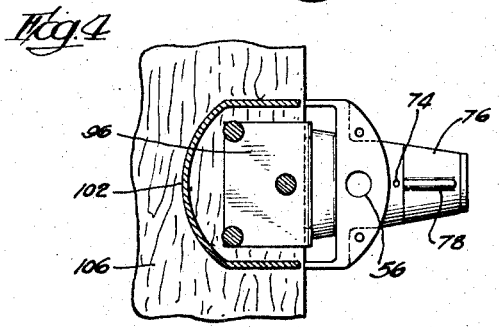
INVENTOR.
NIEMAN C. NELSEN
BY
Fulwider, Mattingly & Huntley
ATTORNEYS.

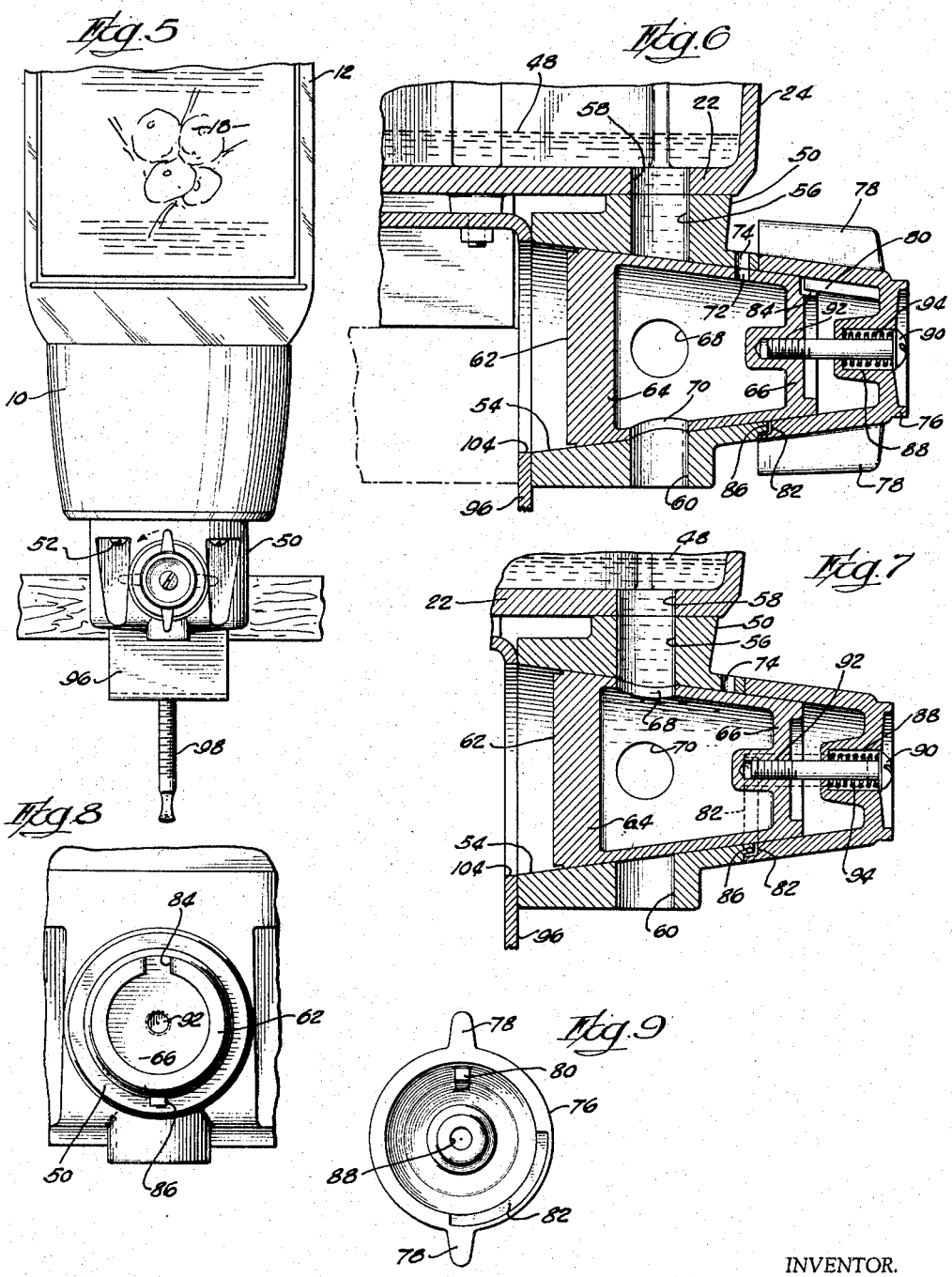

Patented May 19, 1959

2,887,252

MEASURING LIQUID DISPENSER

Nieman C. Nelsen, Arcadia, Calif., assignor to Nesbitt Fruit Products, Los Angeles, Calif., a corporation Application February 18, 1957, Serial No. 640,807

2 Claims. (Cl. 222—181)

The present invention relates generally to liquid dispensers and particularly to apparatus of this type for dispensing a measured amount of liquid.

In the beverage trade many drinks are sold by manufacturers in concentrated form to retail outlets. At these outlets a predetermined quantity of the concentrate is diluted with a proportionate part of plain water, soda water, or other similar liquid and then served to the customer. It is of great importance that the proper proportion of concentrate in the diluted solution be maintained at all times, since any appreciable variation would lead to customer dissatisfaction and thus reflect on the quality of the manufacturer's product. Accordingly, it has been found desirable for the manufacturer to provide to each of his vendors a dispenser base that at each use will deliver the desired predetermined volume of concentrate into standard size glasses.

Such bases are usually furnished by the vendor free of charge with the understanding that only jugs containing the manufacturer's product will be dispensed therefrom. Frequently the base itself prominently displays the manufacturer's trademark. Under these circumstances it is particularly important that only jugs of the genuine concentrate be used with the base, since the use of inferior substitutes will unfairly reflect on the valuable good-will associated with authorized manufacturer's trademark. Therefore, it is desirable that the jugs and bases of the manufacturer be of such construction to exclude the possibility of using jugs of an imitator's concentrates with the dispensing base.

Obviously, it is economically impractical for the manufacturer to construct different bases to fit in with each vendor's particular arrangement of fixtures. The confusion of dispensers in a typical soda fountain will bear this out. The dispensing base furnished by the manufacturer of the concentrate must be adapted to fit in any available space, and this space may be on the counter or on a ledge next to the wall. Bearing in mind the need for a base that will accept only jugs containing a genuine concentrate, it will be apparent that, irrespective of the placement of the base, it should support the jug in such a way that the manufacturer's label thereon is at all times visible to the customer.

An object of my invention is to provide a dispensing apparatus that, upon each actuation thereof, is adapted to deliver a predetermined volume of a liquid.

A further object of the invention is to provide a dispenser apparatus comprising a special jug or reservoir that is adapted for exclusive registration with a dispenser base whereby the use of standard forms of jugs with the base is prevented. At the same time the special jug or reservoir of my invention is so constructed that it can successfully be supported on standard types of dispenser bases.

Still another object of my invention is to provide a dispenser apparatus that is adapted for placement on either a wall ledge or a counter edge in such a way that the identifying label of the manufacturer carried by the jug will at all times be visible to the customer.

The invention also has for an object the provision of a simple dispenser assembly in which the removal of an empty jug and the replacement thereof by a newly filled jug can easily and quickly be accomplished.

These and other objects and advantages of my invention will be apparent from the following description of a presently preferred form thereof and from the drawings annexed hereto illustrating that form in which:

Figure 1 is a vertical elevation of apparatus embodying my invention partly in section and showing the apparatus mounted on a wall ledge with the jug label facing the customer;

Figure 2 is a view similar to Figure 1 but showing the apparatus mounted on a counter edge with the label facing the customer;

Figure 3 is a horizontal transverse section of the apparatus shown in Figure 1 and taken along the line 3—3 in order to show the alignment means controlling the registration of the jug with the dispenser base;

Figure 4 is a horizontal transverse view taken on the line 4—4 of Figure 1;

Figure 5 is a partial front elevation of the apparatus;

Figure 6 is a partial sectional view on an enlarged scale showing the construction of the valve means included in the dispenser base with such means in open position;

Figure 7 is a view similar to Figure 6, but showing the valve means in closed position;

Figure 8 is a front end view of the valve means with the cover or handle thereof removed to show details of the valve's construction; and Figure 9 is an end view of the cover of said valve means looking into the interior thereof.

Referring now to the drawings for the general arrangement of the dispensing apparatus and, in particular, to Figures 1 and 2 thereof, it will be seen that the apparatus includes a base 10 that is adapted to rigidly support an inverted jug or reservoir 12. The jug 12 has a special form of neck 14 that is adapted for exclusive registration with a plurality of alignment elements 16 carried inside the base 10. The alignment elements 16 prevent rotation of the jug 12 on base 10 and also prevent insertion of the jug neck 14 into alignment elements 16, except in certain predetermined angular positions of the jug relative to the base. Thus, when the apparatus is mounted on a wall ledge, as in Figure 1, a label portion 18 carried by jug 12 will be opposite the wall and facing a customer. When the apparatus is affixed to a counter edge in the manner shown in Figure 2, the label portion 18 will face over the counter towards the customer. The base 10 has faucet or valve means 20 mounted therein by means of which a predetermined quantity of the liquid carried by jug 12 can be dispensed from the apparatus into a standard size glass.

The construction of the base 10 can best be seen in Figures 1, 2, and 3. This base includes a horizontal round bottom panel 22 from the periphery of which a substantially cylindrical wall extends upwardly. The upper edge of the wall 24 is chamfered or beveled inwardly as indicated at 26 for supporting the weight of the jug 12 and its contents on the jug shoulder 28. It will be observed that the internal depth or height of wall 24 is greater than the distance between the mouth 30 of the jug and the line of contact of the upper edge of wall 24 with jug shoulder 28. Supported in this manner the mouth 30 of jug 12 is vertically spaced above the upper surface of the bottom panel 22 of the base 10.

The jug neck 14 is formed with thread means indicated at 32 that are adapted to receive a conventional cap (not shown) for the purpose of sealing the contents of jug 12 during its transportation from the manufacturer to its point of use. A conventional type of lug (not shown) may also be formed on neck 14 that will be accommodated by any of the ordinary types of dispenser base. However, for use with my improved dispenser base neck 14 must be provided with a special lug 34 adapted for exclusive registration with base 10.

The lug 34 comprises a continuous bead extending circumferentially around the neck 14 that has four flat surfaces 38 formed thereon. The four flat surfaces 38 are equally circularly spaced around the bead 34 and thus are at right angles to one another. Adjacent to lug 34 the neck 14 develops into a conical section 36 that flares outwardly towards the shoulder 28 of the jug. This special lug 34 and section 36 are adapted for registration with the alignment elements 16 of base 10.

As is shown in Figure 3, base 10 has four of the elements 16 formed integrally therewith. Each of these elements is T-shaped in plan view and comprises an upstanding reinforcing rib 40 that extends radially inwardly from wall 24 to develop into a flat member 42. The flat member 42 extends to both sides of the rib 40 and is chordally disposed relative to wall 24. As can be seen by reference to Figures 1 and 2, the upper edges of ribs 38 are tapered upwardly and outwardly from flat members 42 in the manner indicated at 44. This taper is complementary to that of the conical section 36 of neck 14. By this arrangement the centering of jug 12 on base 10 is facilitated during the lowering of the jug into place on the base.

The four alignment elements 16 are equally circularly spaced in base 10 in confronting pairs. The spacing between confronting faces of flat members 42 is slightly greater than that between the pairs of diametrically opposite flat surfaces 38 of neck 14 which are thus slidably received therebetween. Accordingly, only jugs provided with the special lug 34 can successfully be placed between aligned elements 16 in such a way as to provide a rigid dispenser assembly. As is apparent when the inverted jug is placed on base 10, the flat surfaces 38 of lug 34 bear squarely against flat members 42 of alignment elements 16. Therefore, the vertical alignment of base 10 and jug 12 is assured and any force tending to turn the jug on the base is resisted. On the other hand, if a conventional jug is attempted to be placed on base 10 its neck will not be engaged by alignment means 16 whereby it will not be rigidly supported. Moreover, most conventional jugs are provided with handles on their necks and the spacing between the adjacent vertical edges of flat member 42 is less than the width of such handles whereby jugs so equipped cannot be supported at all on base 10.

The label portion 18 of jug 12 is outlined by an integrally formed frame element 46. The label itself may take the form of a design or letters cast integrally with the jug or the label portion 18 may be perfectly smooth in order to have a paper sign affixed thereto. As an examination of Figures 1, 2, and 3 will show, the center line of the label portion 18 is located midway between the flat surfaces 38 of the jug neck 14. With this arrangement, insertion of a new jug 12 into dispenser base 10 can be very quickly and easily accomplished since the label 18 serves as a guide to the positioning of the jug neck 14 relative to alignment elements 16. The jug 12 is merely inverted with the label 18 facing the user or on the opposite side of the jug from the user in the manner shown in Figures 1 and 2, respectively. With the jug 12 in this position, only slight rotative adjustment of the jug may be necessary to bring the flat surface 38 into flush contact with the flat members 42 of alignment elements 16.

As has already been pointed out, when the jug 12 is in inverted position on base 10, the mouth 30 thereof is vertically spaced above the bottom panel 22. This permits a portion of the liquid contained in the jug 12 to flow downwardly therefrom to form a pool of liquid 48 inside of the base 10. When the level of the pool 48 rises above the downwardly opening mouth 30 of jug 12, an air seal is formed that prevents further emptying of jug 12. As will presently be apparent, the apparatus dispenses fluid through valve means 20 that are drawn from the pool 48 rather than directly from the jug 12. When sufficient liquid has been drawn from pool 48 to lower its level below that of the mouth 30, further liquid will flow from the jug until the level of pool 48 once again forms an air seal around the mouth 30.

Rigidly affixed to the bottom of base 10 by means of screws 52 or the like, is a valve housing 50 that is also preferably made of a plastic material. The housing 50, best seen in Figures 6 and 7, has a horizontally disposed bore 54 that tapers to a reduced diameter outer end. Extending vertically upward from bore 54 is an inlet 56 that communicates with the pool 48 in base 10 through a hole 58 that is formed in the bottom panel 22. An outlet 60 extends vertically downwardly from bore 54 in coaxial alignment with inlet 56 to open into the bottom face of the valve housing 50.

A hollow valve member 62 is rotatably mounted in bore 54 of housing 50. The valve 62 is of conical shape of the same taper as the bore 54 in order to be matingly received therein. At its larger end, the valve 62 is closed by a wall 64 and its smaller end is closed by a wall 66. The dimensions of valve member 62 are such that for each operation of the dispenser it will dispense a predetermined quantity of concentrate into a glass of given capacity that will result in a drink of the desired strength when the glass is filled with water or the like.

Valve member 62 is formed with two ports 68 and 70 that are spaced apart 90 degrees from one another. Port 68 is adapted for registration with inlet 56 in the manner shown in Figure 7. When valve 62 is in this position, a wall portion thereof closes the outlet 60 and the port 70 is closed by a wall portion of the housing bore 54 so that concentrate entering the valve member 62 through inlet 56 cannot escape. When it is desired to dispense the measured volume of concentrate in the valve 62, it is turned through an arc of ninety degrees to the position shown in Figure 6. In that position the port 70 registers with the housing outlet 60. The housing inlet 56 is closed by a wall portion of valve 62 and port 68 is closed by a wall portion of housing bore 54. At the same time, an orifice 72 in the wall of valve member 62 is brought into registration with the upwardly opening air vent hole 74 formed in an upper wall portion of housing 50, thus permitting the measured amount of concentrate to flow from valve 62 into a glass held under the outlet 60.

A cap or handle 76 is mounted on the outer end of valve 62 for the purpose of actuating the valve. The cap 76 is shown in Figure 9, which is an end view looking into its interior. A pair of diametrically opposite finger engaging tabs 78 are formed integrally with the cap and extend radially outwardly therefrom. It will be observed that on its interior the hollow cap 76 has a longitudinally extending rib 80, and on its open end surface is formed with a recessed 90° quadrant 82. Referring now to Figure 8, it will be noted that the outer end face of valve 62 has a notch 84 that is adapted to receive the inner end of the rib 80. This connection can be seen in Figure 6 and, as is apparent, rotation of cap 76 will also cause rotation of valve 62.

The rotation of cap 76 through the desired ninety degree arc for opening and closing of the valve means 20 is controlled by the quadrant 82 of cap 76. In Figure 8 it will be observed that the outer end face of housing 50 has a projecting stop 86 on its lower side that is adapted to ride in the quadrant 82. The stop 86 is shown in Figures 6 and 7 also. Stop 86 upon coming into contact with either end of quadrant 82 prevents further rotation of valve 62, this action being coordinated with the positioning of valve ports 68 and 70.

The tapered configuration of the valve member 62 is of importance in maintaining a fluid seal between the valve 62 and the valve housing bore 54. Accordingly, I have provided means to wedgingly bias the valve member 62 into rotatable but fluid sealing engagement with the bore 54. The end wall of the cap 76 is formed with a central axially-extending counterbore 88 that is adapted to slidably receive the stem of a cap screw or bolt 90. The threaded end of the screw 90 is received in a blind axially-extending tapped bore 92 that is formed in the end wall 66 of the valve member 62. A compression spring 94 is coiled around the stem of screw 90 to bear against the underside of the head of the screw and the inner end of the counterbore 88. The spring compression can be adjusted by appropriate rotation of the screw 90. By this arrangement, a fluid sealed valve member 62 can be maintained even after much wear has taken place on the contacting surfaces of the valve member 62 and housing bore 54.

The dispenser apparatus can be removably mounted on a wall ledge or counter edge by means of an adjustable U-shaped clamp 96 that is rigidly affixed to the lower surface of bottom panel 22. Adjustment of the clamp 96 is accomplished by means of a threaded thumb screw 98 which is carried by the lower clamp arm. The upper end of the thumb screw 98 carries a rotatably mounted button 100 that is adapted to work in opposition to the lower edge of a wall member 102 that depends from the bottom panel 22 and is integrally formed therewith. The configuration of the wall member 102 is shown in Figure 4 wherein it will be noted that said member surrounds the upper end of clamp 96 so that a neat appearance is achieved. Referring to Figure 7, it will be seen that the web portion of clamp 96 is disposed at the rear end of the valve housing 50. In order to provide access to the valve member 62, this web portion of clamp 96 is formed with an enlarged hole 104 that registers with the inner or rear end of the housing bore 54.

The manner of use of the invention is extremely simple. In Figure 1 there is shown a wall ledge 106 to which the apparatus is affixed by means of the clamp 96 in the position shown. With the dispenser base 10 thus mounted in place, it is ready to receive a fresh jug 12 of the manufacturer's concentrate. The conventional cap is first removed form the jug mouth 30 and the jug then inverted with care being taken to align the label 18 with the valve means 20. It will then be found that the jug 12 can be lowered quickly into the base 10 so that its neck 14 will be received by the alignment element 16 in the manner previously described with a minimum of rotative adjustment of jug 12. If the dispenser base is to be mounted on a counter edge 108, such as is shown in Figure 2, the label 18 will be aligned with reference to the rear of the dispenser or the valve means 20. When the jug 12 has been lowered into place, its weight will be supported by the upper edge 26 of the base wall 24. Initially, a slight flow of liquid from the jug will take place to form the pool 48 in the manner previously described and to fill the valve member 62.

When it is desired to use the apparatus, a glass is first placed under the valve outlet 60. The handle 76 is then turned through an arc of 90° to the position shown in phantom line in Figure 5. This places valve 62 in the position shown in Figure 6, wherein the measured volume of liquid flows through port 70 and outlet 60 into the glass while air enters the valve through air vent means 72, 74. The handle 76 is then returned to the closed position shown in full line in Figure 5, the valve 62 assuming the position shown in Figure 7. The air entrapped in valve 62 is then displaced by liquid flowing thereinto from pool 48. The pool 48 is periodically replenished from jug 12 wherever its level falls below jug mouth 30.

While there has been shown herein what is considered to be a presently preferred embodiment of the present invention, it will be apparent that various modifications and changes may be made with respect to the foregoing description without departing from the spirit of the invention or the scope of the following claims.

I claim:

1. In a liquid dispensing apparatus, the combination comprising: a jug having a reduced neck portion terminating in a mouth and formed with a lug extending circumferentially around said neck that includes a plurality of equally spaced apart peripheral flat surfaces, said neck developing from said lug into a conic section flaring outwardly towards a shoulder of said jug; a base having an upstanding substantially cylindrical wall engageable by said shoulder of said jug to support said jug in inverted position with said mouth spaced above the floor of said base whereby liquid from said jug forms a pool in said base that seals said mouth when the level of said pool exceeds the level of said mouth, and said base having means to dispense liquid from said pool; a plurality of vertical flat members integrally formed within said base and equally circularly spaced around the center of said base in chordally extending relationship to said center and including therebetween a lesser diameter than the circumference of said lug whereby said neck is axially slideably admitted between said flat members only upon angular adjustment of said jug to align said flat surfaces of said lug with said flat members, said flat surfaces and said members cooperating after admission of said lug into said members to limit rotation of said jug on said base; and a plurality of ribs formed integrally with said base extending radially between said flat members and said wall whose upper edges extend upwardly and outwardly from said flat members to define a taper complementary to the taper of said conic section of said jug whereby the neck of an inverted jug is guided by said ribs into axial alignment with said base during lowering of said jug, said ribs also serving to limit admission of said neck into said flat members to aid said wall of said base in supporting said jug with said mouth vertically spaced above the floor of said base.

2. In a liquid dispensing apparatus, the combination comprising: a jug having a reduced neck portion terminating in a mouth and formed with a lug extending circumferentially around said neck that includes a plurality of equally spaced apart peripheral flat surfaces arranged in diametrically opposite pairs; a base for supporting said jug in inverted position and having means to dispense a fluid from said jug; and a plurality of vertical flat members integrally formed within said base and equally circularly spaced around the center of said base in chordally extending relationship to said center in diametrically confronting pairs thereof, the members of each pair being adapted to slideably receive a complementary pair of said flat surfaces of said lugs, and including therebetween a lesser diameter than the circumference of said lug whereby said neck is axially slideably admitted between said flat members only upon angular adjustment of said jug to align said flat surfaces of said lug with said flat member, said flat surfaces and said members cooperating after admission of said lug into said members to prevent rotation of said jug on said base.

References Cited in the file of this patent
UNITED STATES PATENTS

| | | |
|---|---|---|
| 578,718 | Bufard | Mar. 16, 1897 |
| 878,750 | Schmidt | Feb. 11, 1908 |
| 1,053,169 | Gillespie | Feb. 18, 1913 |
| 1,184,878 | Rosenstock | May 30, 1916 |
| 1,879,109 | Coy | Sept. 27, 1932 |
| 2,016,200 | Howard | Oct. 1, 1935 |
| 2,567,282 | Gardner et al. | Sept. 11, 1951 |
| 2,707,069 | Browning et al. | Apr. 26, 1955 |
| 2,775,375 | Haller | Dec. 25, 1956 |